Dec. 25, 1951          A. A. JOHNSON          2,579,926
HEATING PAD CONTROL SYSTEM
Filed April 26, 1944                    2 SHEETS—SHEET 2
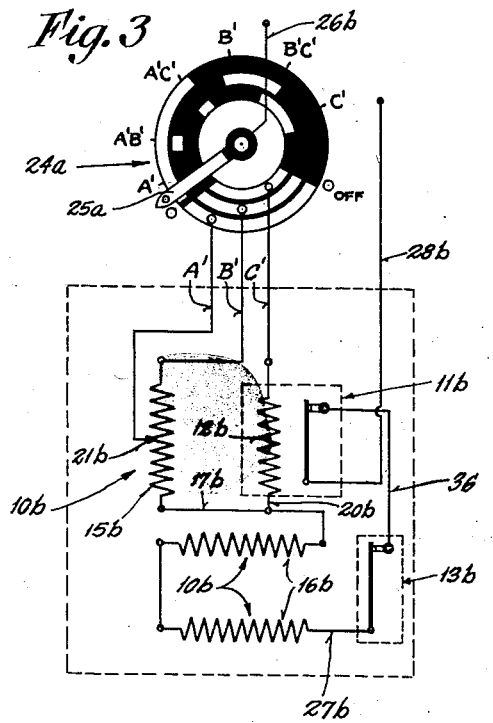
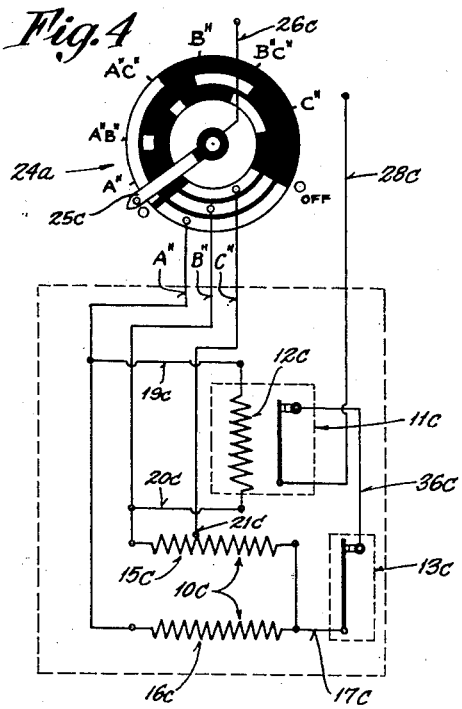
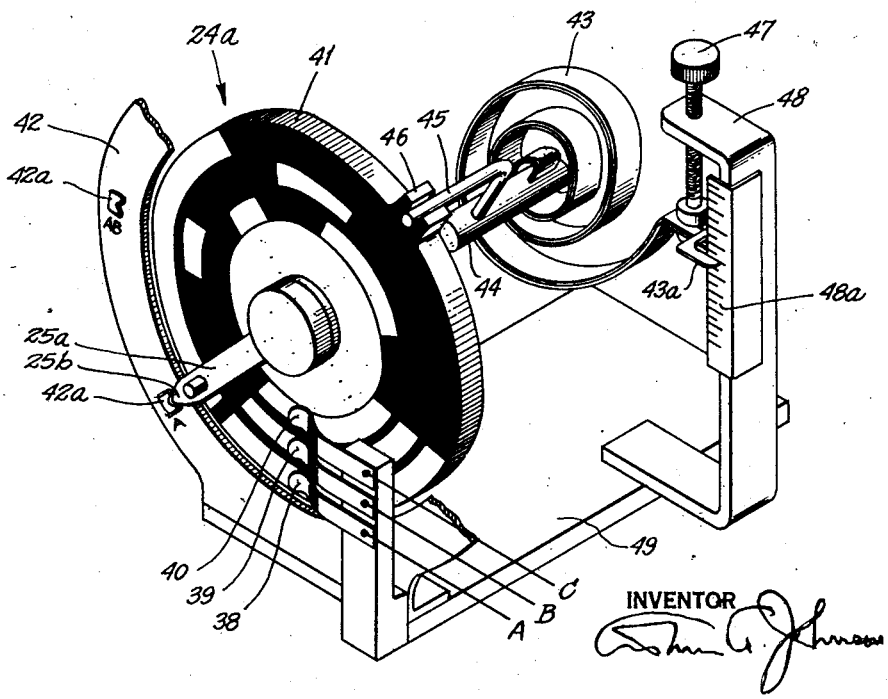
INVENTOR

Patented Dec. 25, 1951

2,579,926

UNITED STATES PATENT OFFICE 2,579,926

HEATING PAD CONTROL SYSTEM

Arthur A. Johnson, Bridgeport, Conn., assignor to Casco Products Corporation, Bridgeport, Conn., a corporation of Connecticut Application April 26, 1944, Serial No. 532,696

18 Claims. (Cl. 219—20)

This invention relates to electric heating pads, blankets, and the like devices which are heated at moderate temperatures and are particularly adapted for personal use, and which are used under conditions where heat dissipation varies substantially. More particularly the invention relates to devices of this type which have a plurality of selectable heats such as low, high and in between.

In one arrangement heretofore used in these devices, the control of the heating is accomplished by a thermostat which is located within the pad and set to respond to a single predetermined temperature. A heater is located in the thermostat housing, and for the lower settings of a switch interposed in the electric supply cord of the device, the thermostat responds to heat transferred from the heater, which is energized to various degrees through circuits controlled by said switch.

In these devices the high heat of the pad or blanket is obtained when the heater for the control thermostat is completely de-energized, reliance being placed solely on the heat from the heating element of the device being transferred to the thermostat to operate the latter. The rate of transfer of heat varies widely with variations in the assembly of the devices and the conditions under which the pad is to be used, and therefore it is difficult to hold the high heat range within desirably close or specified limits. Also, when the device is first connected in the circuit and the switch turned to "high" position, a considerable initial overshooting of the set temperature occurs, often in the neighborhood of 20° to 30° or more, and a period of 20 minutes or longer is required before the device returns to its proper selectively controlled temperature range.

It is an object of the present invention to overcome these difficulties by providing a heating device of this general type wherein a more positive control of the temperature ranges is possible, so that a wide range of accurately held useful heats, distributed uniformly over the area of the device is obtainable, all with a minimum of connections thereto.

This is accomplished in several forms of the invention illustrated herein by a novel control circuit of thermostat, heater therefor, and heating element, connected in such a manner that the thermostat heater is always energized, regardless of which heat the device is set for, and the element also wholly energized, or substantially wholly energized, for these settings. In this circuit reliance is not placed on transfer of heat from the heating element to the control thermostat to maintain any one range of temperatures and therefore initial overshooting of the pad temperature with its undesirable overheating is held to an extremely small value, less than 5° being often obtained. Cooperating with this control circuit is a thermostatic regulator which corrects for ambient temperature variations, so that the resulting heat of the device is held closely to the desired value regardless of variations in atmospheric temperature.

According to one such arrangement provided by the invention, as applied to a heating pad, three widely separated positively controlled heats are obtainable with only a total of three wires connecting to the pad. In another arrangement connections are provided so that a total of six different heats is obtainable with only four wires connecting to the device. This is particularly advantageous for use with blankets and the like.

In still another illustrated form of the invention six different heats are obtainable with a thermostat set for a given temperature, and controlled by a heater, and with only four wires connecting to the device, but the control is arranged to provide a wider spread between the low and high temperatures of the device.

To conveniently select any of the various possible temperature ranges, switch mechanisms are provided in the control circuits of these devices.

In further carrying out this accurate control of the temperature ranges, the present invention provides means connected with the switch mechanisms to compensate for variations in ambient temperature.

In the embodiments of the invention illustrated herein this compensation is accomplished by a thermostatic regulator which continuously automatically operates a switch mechanism without outwardly changing the setting of the switch, to offset changes in the ambient temperature.

Other features and advantages will hereinafter appear.

In the drawings:

Fig. 3 is a schematic diagram illustrating a modified form of six-heat device.

Fig. 4 is a schematic diagram illustrating another modified form of a six-heat device, and Fig. 5 is a diagrammatic perspective representation of the ambient temperature controlled regulator of the invention.

Figure 1:
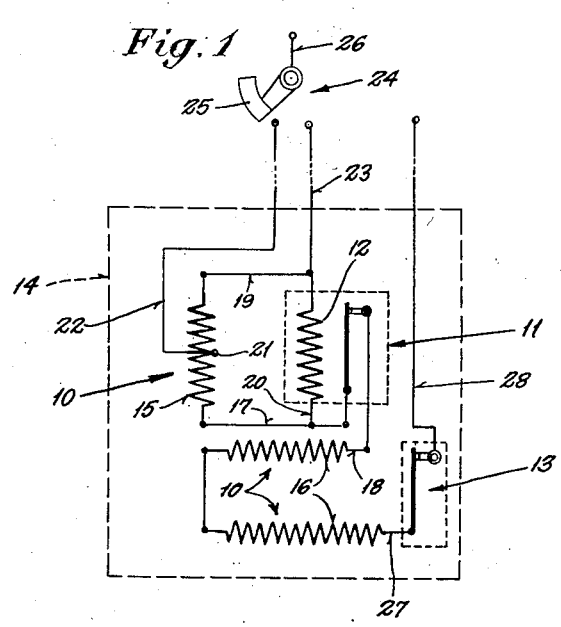
Figure 1 is a schematic diagram of a heating pad having three selectable heats, illustrating one form of the invention.

The heating pad shown in Fig. 1 comprises a heating element represented as a whole by the numeral 10, a temperature-regulating thermostat 11 outlined in broken lines and having within its housing a heater 12, and a safety or overheat preventing thermostat 13 similarly outlined, all mounted in a supporting pad structure 14, also indicated in broken outline.

According to the present invention an improved controlling circuit is provided for the heating element and thermostats so that, through the medium of only three connections to the pad, three desirably separated accurate temperatures in the pad may be obtained by having the heater 12 always energized, while the pad is in use, and by having the element 10 either wholly or substantially wholly energized to provide a uniform distribution of heat throughout the pad structure 14.

For this purpose the heating element 10 is divided into what I term a minor or control portion 15 and a major main portion 16, the adjacent ends of said portions are connected, in the form shown, by wires 17 and 18 respectively to the control thermostat 11. The portion 15 of the heating element is connected in parallel with the thermostat heater 12 by wires 19 and 20 so that a network is formed thereby, and said portion is tapped intermediate its ends as indicated by the numeral 21, and connected to a lead wire 22, a second lead wire 23 connects with the wire 19, both of said leads in turn connecting to contacts of a bridging blade selector switch 24, the blade 25 of which receives energy from a supply line 26.

The other end of the portion 16 of the heating element is connected by a wire 27 to the safety thermostat 13 which is set to open the circuit only in response to a maximum temperature above which dangerous overheating of the pad might result, and which in turn connects to the other supply line 28 of the pad.

The heating element 10, and also the thermostats 11 and 13 may be made up and fastened to the pad structure 14 in any suitable manner and may be inserted in the circuit as shown or in any other part, the breaking of which will cause the current to cease flowing.

I have found it desirable to coil the element 10 spiral fashion, with the control portion 15 on the outside convolution, and to locate the thermostat 11 adjacent the portion 15 to shorten connections thereto.

The switch 24 has in addition to an "off" position, three "on" positions so that it may connect the leads 22 and 23 either singly or jointly to the line wire 26, or disconnect the latter entirely from the pad circuit.

According to this circuit arrangement three different predetermined values of current may be caused to flow in the heater 12 when the thermostat 11 is in closed position, causing the latter to operate off and on according to three different frequencies.

When the blade 25 of the selector switch is connecting solely to the conductor 22, current will divide at the tap 21, part flowing through the wire 19 and heater 12. When the blade of the switch connects solely to the conductor 23, current will divide between the portion 15 of the element, and the heater 12, the current through the latter being different from that flowing during the first-mentioned switch connection. A third different current is caused to flow in the heater 12 when the switch blade 25 bridges both contacts, short-circuiting that part of the element 10 included between the tap 21 and the wire 19.

Thus the heating element 10, and therefore the pad, may be caused to heat to either of three predetermined temperature ranges. These ranges may be spread widely apart, or brought close together by properly choosing the resistance values of the heater 12, and portions 16 and 15 of the heating element, and also the location of the top 21 on the latter portion.

For instance, considering an electrical supply of 110–120 volts, the following values may be used: For the heater 12, thirty to thirty-three ohms; for that part of the control portion 15 located between the tap 21 and the conductor 17, twenty-six ohms; for that part of the portion 15 located between the tap 21 and the conductor 19, sixty ohms; for the major portion 16 of the heating element 10, approximately two hundred ten ohms. With these values the thermostat 11 may be set to produce in the pad, temperatures of 132° F., 152° F., and 179° F., for the three "on" settings respectively of the switch 24.

According to this improved control circuit, since the heater 12 is energized for all "on" settings of the switch 24, reliance is at no time placed on a transfer of heat from the heating element 10 to the control thermostat 11 to maintain a predetermined temperature range in the pad. Thus overshooting of the high pad temperature when the pad is initially connected with the switch in "high" setting is reduced to a small inconsequential value. Also, since the transfer of heat from the element 10 is an extremely variable factor, varying widely with differences in pad assembly, its elimination provides for a more stable pad performance.

The part of the heating element 10 included between the tap 21 and the conductor 19 is short-circuited, and therefore inactive when the switch blade 25 bridges both contacts. However, the length of this part is extremely short compared with the overall length of the element, and being located preferably along the outer edge of the pad, has no appreciable effect on the heat distribution.

Figure 2:
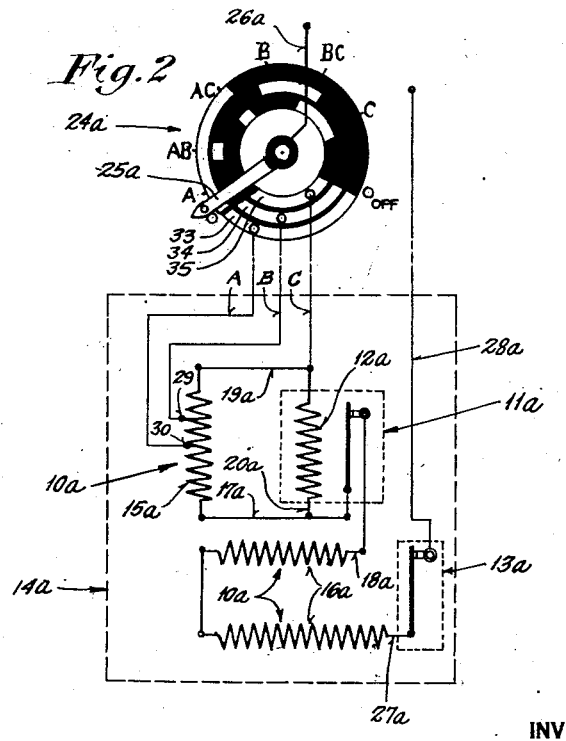
Fig. 2 is a schematic diagram of a device illustrating another form of the invention, having six selectable heats.

A modification of the invention is shown in Fig. 2 wherein a device having a thermostat preset to a single operating temperature, and having but four connecting wires may be operated to provide any of six accurately controlled predetermined temperatures. This construction may be advantageously employed in connection with electrically heated blankets and the like, in addition to its use in a heating pad. The device comprises a heating element designated by the numeral 10a, a control thermostat 11a having a heater 12a, and a safety thermostat 13a, all mounted in a supporting structure 14a.

The heating element 10a is divided into a control portion 15a and a main heating portion 16a, the two being connected by wires 17a and 18a to the contacts of the thermostat 11a.

According to the present invention, to provide positive control of the heating of the device and prevent over-shooting, the heater 12a is connected to be energized at all times that the device is being heated. Accordingly, it is connected in parallel with the portion 15a of the heating element by wires 19a and 20a as shown, so that a network is formed with the latter for the purpose of obtaining six positive temperature ranges, the control portion 15a being provided with a plurality of taps 29 and 30 which are connected to conductors A and B respectively. A third conductor C is connected with the wire 19a, so that all three conductors may be utilized with a switching means to obtain different temperature ranges in the device.

For the purpose of connecting the conductors A, B and C either singly or in different pairs to a supply line 26a, a selector switch 24a is provided having a contact blade 25a and a plurality of contact rings 33, 34 and 35. The switch 24a is so constructed that segments of the rings 33, 34 and 35 may be engaged by the blade 25a in various combinations as shown to effect the aforementioned connections between the conductors and the supply line.

To complete the current supply to the device, the other end of the main heating portion 16a of the heating element is connected by a wire 27a to the safety thermostat 13a which is in turn connected to the supply line 28a.

According to these connections it is possible through the use of only the four connecting wires A, B, C and 28a, to obtain any of six predetermined positively controlled temperatures, as determined by the setting of the switch 24a.

For instance, when the switch blade 25a is in position "A" for "high" heat, the supply line 26a is connected solely to the conductor A. Current flowing through this conductor will divide at the tap 30 and a portion of it will pass through the heater 12a. This will cause the thermostat 11a to open and close at a certain predetermined frequency which is a factor in determining the temperature of the device for setting "A." If the switch blade 25a is in the position "AB" for next to "high" heat, the supply line 26a will be connected to both of the conductors A and B, in which event that part of the control portion 15a of the heating element included between the taps 29 and 30 will be short-circuited. Current flowing through the supply line 26a will divide between the conductors A and B and a portion will flow through the heater 12a. This current through the heater will have a value different from that flowing through it when the switch blade 25a is in position "A" and therefore the device will have a different controlled temperature for setting "AB."

Similarly, with the switch blade 25a in position "AC" for "high medium" heat, that part of the control portion 15a of the heating element which is included between the tap 30 and the wire 19a will be short-circuited, and current will divide between the conductors A and C so that the heater 12a will carry still another value of current. In the same manner, moving the switch blade to positions "B," "BC" and "C," will result in other higher values of current flowing through the heater 12a, and respectively lower values of temperature in the device, position "C" representing the "low" temperature.

Thus for each of the six above-mentioned positions of the switch blade 25a, six different values of current will be caused to flow through the heater 12a, and as a result six different positively controlled make and break frequencies of the thermostat 11a may be obtained with only four wires connected to the device.

According to the present invention an improved regulator connected to operate the switch 24a is provided to compensate for variations in ambient or atmospheric temperature existing about the device, when made up as a blanket or the like. This regulator is adapted to continuously control the relative position of the switch body with its rings 33, 34 and 35 and the blade 25a. Since as shown the blade 25a is manually adjustable, it is preferable to arrange for the regulator to adjust the switch body, although of course the arrangement can be reversed if desired.

Referring to Fig. 5, connections to the rings 33, 34 and 35 of the switch 24a are made through brushes 38, 39 and 40 respectively which are connected to the conductors A, B and C respectively. The body of the switch, consisting of a disk 41 which carries the contact rings, is mounted for rotation with respect to a scale 42 for the blade 25a.

For the purpose of adjustably moving the disk 41 with respect to the blade 25a, a spiral heat-responsive element 43 is provided, having its inner end fastened to a shaft 44 carrying an arm 45 having a driving connection with a lug 46 on the periphery of the disk 41. The element 43, which may be bimetallic or of other well-known construction, has its outer end fastened to a screw 47 threaded into a stationary post 48 mounted on the switch base 49, which also carries the scale 42.

The tip 25b of the switch blade 25a is positioned by raised or embossed detents 42a in the scale 42 so that it is frictionally held in any setting regardless of movement of the disk 41.

As the switch 24a is thus arranged, the blade 25a may be set to produce a given temperature range in the blanket. The indication of this range may be given on the scale 42, according to the connections effected by the blade. If, with such a setting, the blanket is brought into a comparatively warm atmosphere, the heat-responsive element 43 in the switch will uncoil and move the disk 41 counterclockwise. This will cause a change of connections to the blade 25a to produce less heat in the blanket, the amount of change being sufficient to compensate for the warm ambient temperature. In a similar manner, a cooler room temperature would cause the element 43 to coil more tightly, causing clockwise rotation of the disk 41 and a change of connections to provide more heat in the blanket.

For checking the adjustment and calibration of the spiral element 43 the screw 47 is made adjustable so as to advance or retard the anchored end of the spiral 43 when the screw is rotated and thus, through the spiral, advance or retard the disk 41 relative to the contact arm 25a.

By properly choosing the resistance values and wire sizes of the heater 12a, and heating element portions 15a and 16a, and by properly locating the taps 29 and 30 the difference between each temperature range of the blanket and the next higher range may be made sufficiently great to provide a satisfactory practical scale. Due to the heater being energized for all "on" settings of the switch 24a, the temperature control of the blanket will be held to close limits.

Those parts of the control portion 15a of the heating element which are short-circuited and therefore inactive for certain settings of the switch 24a are of comparatively small resistance and length, compared with the energized remainder of the element, and being preferably located along the outer edge of the blanket, have no appreciable effect on the uniform heating of the surface.

The switch 24a is provided with an "off" position as indicated so that the supply line 26a may be entirely disconnected from the device.

Another modification of the invention, consisting of a four-wire six-heat blanket is shown in Fig. 3. In this device a heating element 10b has one end connected through a wire 27b to a safety thermostat 13b which is in turn connected by a wire 36 to a control thermostat 11b, the latter being connected to a supply line 28b. The heating element 10b is divided into a control portion 15b and a main heating portion 16b, the two being connected together by a wire 17b. The control thermostat 11b has a heater 12b having one end connected by a wire 20b to the wire 17b.

The other end of the portion 15b of the heating element is connected to a conductor B', and a tap 21b is provided on said portion, and connected with a conductor A'. Also, the other end of the heater 12b is connected to a conductor C', and the three conductors A', B' and C' are connected with the other supply line 26b through a selector switch 24a as shown.

The switch 24a connects the conductors A', B' and C' either singly or in three different pairs to the supply line 26b, and for three of these connections, indicated C', B'C' and A'C', a different current is caused to flow in the heater 12b.

Therefore four heats are obtainable according to the four designated positions C', B'C', B' and C'C' of the switch 24a, with four wires connecting to the heating pad.

Another modification of four-wire six-heat blanket is shown in Fig. 4. This blanket comprises a heating element 10c, safety thermostat 13c and control thermostat 11c having a heater 12c. The heating element 10c consists of a control portion 15c and a main heating portion 16c, the adjacent ends of these being connected together by a wire 17c connected to the safety thermostat 13c. Connection is made from a supply line 28c through the control thermostat 11c and a wire 36c to the safety thermostat 13c.

The other ends of the heating element portions 15c and 16c are respectively connected to conductors B'' and A'', which connect individually with separate ring segments of a selector switch 24a. A tap 21c is provided on the control portion 15c of the heating element, and connected by a conductor C'' to a third ring segment of the switch 24a.

Control of the heating of the element 10c is accomplished by connecting the heater 12c by means of conductors 19c and 20c to the conductors A'' and B'' respectively. The blade 25c of the switch is connected with the remaining supply line 26c.

The values of resistance, and sizes of wire of the heater, and portions of the heating element are chosen preferably to provide a uniform scale of graduated temperatures in the blankets for the various switch settings. The location of the taps of the control portion of the heating element must also be considered in connection with these resistance values.

Variations and modifications may be made within the scope of this invention and portions of the improvements may be used without others.

I claim:

1. In a heating device, a heating element; circuit means for the same, including a thermostatic switch and a supply wire; a heater for the switch; means permanently connecting the heater across a portion of the heating element to form a resistance loop, the substantial resistive portions of which consist solely of said heater and said portion of the heating element; and means for varying the flow of current in said thermostat heater by connecting the supply wire to not more than two of a plurality of points on said loop.

2. In a heating device, power-supply means; a heating element; a thermostatic switch controlling the supply of current from the power-supply means to the heating element; a heater for the thermostat having one end permanently connected to the heating element; a pair of conductors having one end each connected to different points on the heating element different from the heater connection; and means for variably connecting the conductors and the other end of the heater separately or in groups selectively to said power supply means to vary the temperature of the thermostat heater and thereby variably control the temperature of the device.

3. In a heating device, a heating element; a thermostatic switch controlling the circuit for the heating element; a heater for the switch; means connecting said heater permanently across a portion of the heating element; current-supply means; and means for connecting said current-supply means selectively to any of a plurality of points of said portion of the heating element to vary the value of the current flowing through said thermostat heater and thus the temperature of the heating device to be maintained by the thermostat.

4. In a heating device, a heating element; a thermostatic switch controlling the circuit for the heating element; a heater for the switch; means connecting said heater permanently across a portion of the heating element; current supply means; a pair of conductors each at one end connected to different points of said heating element portion; and a selector switch connected to the current supply means and to the other ends of the conductors for connecting the latter individually or jointly to the current supply means for controlling the energization of the heater, and therefore the heating of the heating element.

5. In a heating device, a heating element; a thermostatic switch controlling the circuit for the heating element; a heater for the switch; means connecting said heater permanently across a portion of the heating element; current supply means; and means for connecting said current supply means to either of three different points on said portion of the heating element, or to either of three different pairs of said points to produce either of six predetermined values of current in said thermostat heater and thus maintain either of six predetermined temperatures of the heating device.

6. In a heating device, a heating element and a thermostatic switch connected in series therewith to divide the element into two parts; a heater for the switch; and means connecting said heater permanently to bridge one of said parts of the heating element.

7. In a heating device of the character described, a heating element; a conductor connected to one end of the element; a conductor connected to a point on the element spaced from said end; a thermostatic switch connected to control the heating of the element; a heater for the thermostatic switch, having one end permanently connected to the heating element at a point spaced electrically a greater distance from said heating element end than the point of connection of the second conductor; and means for supplying current to the heating element, including switch means connecting one side of said supply to said conductors individually or jointly, the other end of the thermostat heater being connected through said switch means to said current supply to cause a variation in the heating thereof to control the thermostatic switch and regulate the temperature of the heating element in response to the switching to said conductors.

8. In a heating device of the character described, a heating element; a conductor connected to one end of the element; a conductor connected to a point on the element spaced from said end; a thermostatic switch connected to control the heating of the element; a heater for the thermostatic switch, having one end permanently connected to the heating element at a point spaced a greater distance from said heating element end than the point of connection of the second conductor and having its other end permanently connected to the said first conductor; and current-supply means connected to the heating element, including means for switching one side of said supply to said conductors individually or jointly, to cause a variation in the heating of the heater to control the thermostatic switch and regulate the temperature of the heating element in response to the switching to said conductors.

9. The invention as defined in claim 7, in which there is a third conductor having one end connected to the heating element at a point intermediate the connections for the said conductors, and having the other end connected to the switching means, and in which said switching means connects one side of the supply to all said conductors individually or in groups to provide twice the number of selectable temperatures as there are conductors.

10. In a heating device of the character described, a heating element; current supply means having one leg connected to the heating element, a thermostatic switch in the circuit for the heating element for controlling the heating thereof; a heater for said switch, having one end permanently connected to the heating element; three conductors; means for connecting said conductors singly or in three different groups to the other leg of the current supply means; means for connecting said conductors to the heating element and the other end of the heater to produce either of six predetermined different values of current in the heater in response to six different connections effected by said connecting means between the said other leg of the current supply means and the three conductors, to maintain either of six different predetermined temperatures of the heating device.

11. In a heating device of the character described, a heating element; current supply means having one leg connected to one end of the heating element, a thermostatic switch in the circuit for the heating element for controlling the heating thereof; a heater for said switch, having one end permanently connected to the heating element at a point intermediate its ends; three conductors; means for connecting said conductors singly or in three different groups to the other leg of the current supply means; means for connecting said conductors respectively to the other end of the heater, the other end of the heating element, and a point on the heating element intermediate said other end and the connection of the heater to the element to produce either of six predetermined different values of current in the heater in response to six different connections effected by said connecting means between the said other leg of the current supply means and the three conductors, to maintain either of six different predetermined temperatures of the heating device.

12. In a heating device of the character described, a heating element; current supply means having one leg connected to one end of the heating element, a thermostatic switch in the circuit for the heating element for controlling the heating thereof; a heater for said switch; means permanently connecting the ends of the heater to a portion of the heating element at the other end thereof to form a network therewith; three conductors; means for connecting said conductors singly or in three different groups to the other leg of the current supply means; means for connecting said conductors respectively to the common end connection of the heater and heating element and two other points of the heating element intermediate said common connection and the connection of the first-named end of the heater to the element to produce either of six predetermined different values of current in the heater in response to six different connections effected by said connecting means between the said other leg of the current supply means and the three conductors, to maintain either of six different predetermined temperatures of the heating device.

13. In a heating device of the character described, a heating element; current supply means having one leg connected to a point of the heating element intermediate its ends; a thermostatic switch connected to the heating element for controlling the heating thereof; a heater for said switch; means permanently connecting the ends of the heater to the ends of the heating element to form a network therewith; three conductors connected respectively to the two ends of the heating element and a point intermediate said ends and different from the connection to the element of the said one leg of the current supply means; means for connecting said conductors singly or in three different groups to the other leg of the current supply means to produce either of six predetermined different values of current in the heater in response to six different connections effected by said connecting means between the said other leg of the current supply means and the three conductors, to maintain either of six different predetermined temperatures of the heating device.

14. In a heating device of the character described, a heating element; energizable control means including a heat-responsive member so connected with the element as to control the heating thereof in response to the degree of energization of said control means; a plurality of conductors so connected with the heating element and the control means that their connection with a current supply in different combinations produces a plurality of different degrees of energization of said control means, each resulting in a different temperature range in said heating element; a switch for connecting said conductors to a supply in any one of said plurality of different combinations; and automatic temperature responsive means located remotely from the heating element for operating the switch to decrease or increase the heating of the element in response to rises or drops respectively in ambient temperature.

15. The invention as defined in claim 14, in which the switch comprises a dial to indicate settings, a contact arm movable with respect to the dial and indicating its position thereon, and a body portion movable with respect to the dial and arm, having contacts for engagement with the latter, and in which the automatic means for operating the switch comprises a heat-responsive element connected to move said body portion relatively to the dial and arm, so that the switch may be manually operated by moving the contact arm, and automatically operated by the heat-responsive element without disturbing the indicated setting of the arm.

16. The invention as defined in claim 14, in which the switch is located remotely from the heating element and comprises a contact arm and a body portion relatively movable with respect to the arm and having contacts for engagement with same, and in which there are manually operable means for shifting the arm and body relatively to select a desired temperature for the heating device; and automatic means for shifting the arm and body relatively from the relative position determined by said manual means to compensate for ambient temperature changes.

17. The invention as defined in claim 14, in which the switch has a pair of actuating members, relative movement between which causes operation of said switch, one of said members having indicating means and being manually operable, and in which the automatic means for operating the switch comprises a heat-responsive element conected to move the other of said members so that the automatic operation of the switch does not change the position and indication of said one member.

18. In a heating device of the character described, a heating element; energizable control means including a heat-responsive member so connected with the element as to control the heating thereof in response to the degree of energization of said control means; a plurality of conductors so connected with the heating element and the control means that their connection with a current supply in different combinations produces a plurality of different degrees of energization of said control means, each resulting in a different temperature range in said heating element; a switch for connecting said conductors to a supply in any one of said plurality of different combinations; a thermostatic member movable in response to changes in ambient temperature and located remotely from the heating element; a driving connection between said movable member and the switch for operating the latter; and means for adjustably mounting the movable member so that positions of the switch may be temperature corrected.

ARTHUR A. JOHNSON.

REFERENCES CITED

The following references are of record in the file of this patent:

UNITED STATES PATENTS

| Number | Name | Date |
|---|---|---|
| 903,319 | Richardson | Nov. 10, 1908 |
| 1,020,045 | Merryman | Mar. 12, 1912 |
| 1,112,391 | Spear | Sept. 29, 1914 |
| 1,434,172 | Wagenhorst | Oct. 31, 1922 |
| 1,437,267 | Perkins | Nov. 28, 1922 |
| 1,581,429 | Donle | Apr. 20, 1926 |
| 1,631,484 | Hudson | June 7, 1927 |
| 1,689,809 | Vaughan | Oct. 30, 1928 |
| 1,744,029 | Burkholder | Jan. 21, 1930 |
| 1,757,986 | Whittier | May 13, 1930 |
| 1,903,015 | Steerup | Mar. 28, 1933 |
| 1,930,062 | Rutenber | Oct. 10, 1933 |
| 2,023,544 | Pierson | Dec. 10, 1935 |
| 2,024,625 | Campbell | Dec. 17, 1935 |
| 2,044,147 | Bletz | June 16, 1936 |
| 2,103,560 | Smith et al. | Dec. 28, 1937 |
| 2,122,650 | Keene | July 5, 1938 |
| 2,163,297 | Waage | June 20, 1939 |
| 2,172,189 | Clark | Sept. 5, 1939 |
| 2,177,281 | Lockwood | Oct. 24, 1939 |
| 2,195,958 | Kearsley | Apr. 2, 1940 |
| 2,203,236 | Randolph et al. | June 4, 1940 |
| 2,210,947 | Myers | Aug. 13, 1940 |
| 2,222,800 | Kriechbaum | Nov. 26, 1940 |
| 2,224,983 | Parkhurst | Dec. 17, 1940 |
| 2,237,852 | Taylor | Apr. 8, 1941 |
| 2,259,258 | McCormick | Oct. 14, 1941 |
| 2,264,487 | Smulski | Dec. 2, 1941 |
| 2,331,535 | Candor | Oct. 12, 1943 |
| 2,349,612 | Campbell | May 23, 1944 |
| 2,354,918 | Kearsley | Aug. 1, 1944 |
| 2,360,084 | Taylor | Oct. 10, 1944 |
| 2,367,014 | Finlayson | Jan. 9, 1945 |
| 2,395,152 | Taylor | Feb. 19, 1946 |
| 2,508,349 | Belgeri | May 23, 1950 |

FOREIGN PATENTS

| Number | Country | Date |
|---|---|---|
| 6,739 | Switzerland | Feb. 24, 1893 |
| 86,707 | Switzerland | Oct. 1, 1920 |
| 338,880 | Great Britain | Nov. 18, 1930 |
| 365,092 | Germany | Dec. 8, 1922 |
| 419,892 | Great Britain | Nov. 21, 1934 |
| 448,761 | Germany | Aug. 24, 1927 |
| 543,823 | Great Britain | Mar. 13, 1942 |